July 8, 1969 J. P. CALDWELL ET AL 3,454,335

SCANNING SYSTEM

Filed Dec. 30, 1966 Sheet 1 of 3

INVENTORS
JOHN P. CALDWELL
FRAZER D. PUNNETT
BY Leonard J. Sheltan
Norman C. Schneider
ATTORNEY July 8, 1969 J. P. CALDWELL ETAL 3,454,335

SCANNING SYSTEM

Filed Dec. 30, 1966 Sheet 2 of 3

INVENTORS
JOHN P. CALDWELL
FRAZER D. PUNNETT
BY Leonard J. Shutter
ATTORNEY

INVENTORS
JOHN P. CALDWELL
FRAZER D. PUNNETT
BY Leonard J. Sheltz
Norman P. Schneider
ATTORNEY

United States Patent Office 3,454,335
Patented July 8, 1969

3,454,335
SCANNING SYSTEM
John P. Caldwell, Penfield, and Frazer D. Punnett, Rochester, N.Y., assignors to Xerox Corporation, Rochester, N.Y., a corporation of New York
Filed Dec. 30, 1966, Ser. No. 606,277
Int. Cl. G03g *15/00*
U.S. Cl. 355—8 4 Claims

ABSTRACT OF THE DISCLOSURE

A scanning device wherein a scanning slit is moved in the opposite direction from the direction of movement of an electrostatographic surface to expose the electrostatographic surface at a rate faster than the rate at which the surface is moving.

This invention relates to improvements in the exposure system of xerographic reproduction system of the type that facilitates the making of enlarged xerographic reproductions from minified text on micro-opaque cards or of the type wherein a document is xerographically reproduced from a standard size original on a one-to-one ratio or a reduced basis.

In the process of xerography, a xerographic plate comprising a layer of photoconductive insulating material on a conductive backing is given a uniform electric charge over its surface and is then exposed to the subject matter to be reproduced. This exposure discharges the plate areas in accordance with the light intensity that reached them, and thereby creates an electrostatic latent image on or in the photoconductive layer. Development of the latent image is effected with an electrostatically charged, finely divided material, such as an electroscopic powder, which is brought into surface contact with the photoconductive layer and is held thereon electrostatically in a xerographic powder image pattern corresponding to the electrostatic latent image. Thereafter, the developed xerographic powder image is usually transferred to a support surface, such as, a sheet of copy paper to which it may be fixed by any suitable means.

In a system wherein xerographic reproductions are made from micro-opaque cards which are located on a carriage and are scanned, it is necessary to return the scanning carriage for each reproduction made. The card may be changed on each return or the card may be scanned several times to make multiple copies of the same card. In a case wherein the original is stationary and the scanning device such as a lens carriage is moved, the scanning device itself must be returned. In either case there is usually time when the scanning carriage is returned or when the scanning device is returned.

In most scanning systems interval is required to change originals or return a scanning carriage. This is commonly referred to as "fly back" time. If the carriage could be returned in zero time the "fly back" time would be zero, but this is not possible. The dynamics of the "fly back" time become more critical as the speed is increased. This interval leaves a blank space on the drum which is centrally rotating and results in wasted or unused portion of the photoconductive surface of the drum. If a web is used this results in wasted space thereon. For cut sheets, it is necessary to space the sheets to allow for the gap rather than spacing the sheets as close together as possible. Thus a continuous image on the drum would make full use of the photoconductive surface without any waste of paper or time in the system. This continuous image is provided in the instant invention by exposing the image faster than the drum rotates so that return time will be available to return the scanning carriage or device while the drum catches up with the scan.

It is, therefore, an object of this invention to improve electrostatographic scanning systems whereby the image is laid down in the drum at a rate in excess of the speed of rotation of the drum.

Another object of this invention is to improve scanning systems which do not require a gap between images.

Various other objects and advantages will appear from the following description of one embodiment of the invention, and the novel features will be particularly pointed out hereinafter appended with the claims.

Figure 1:
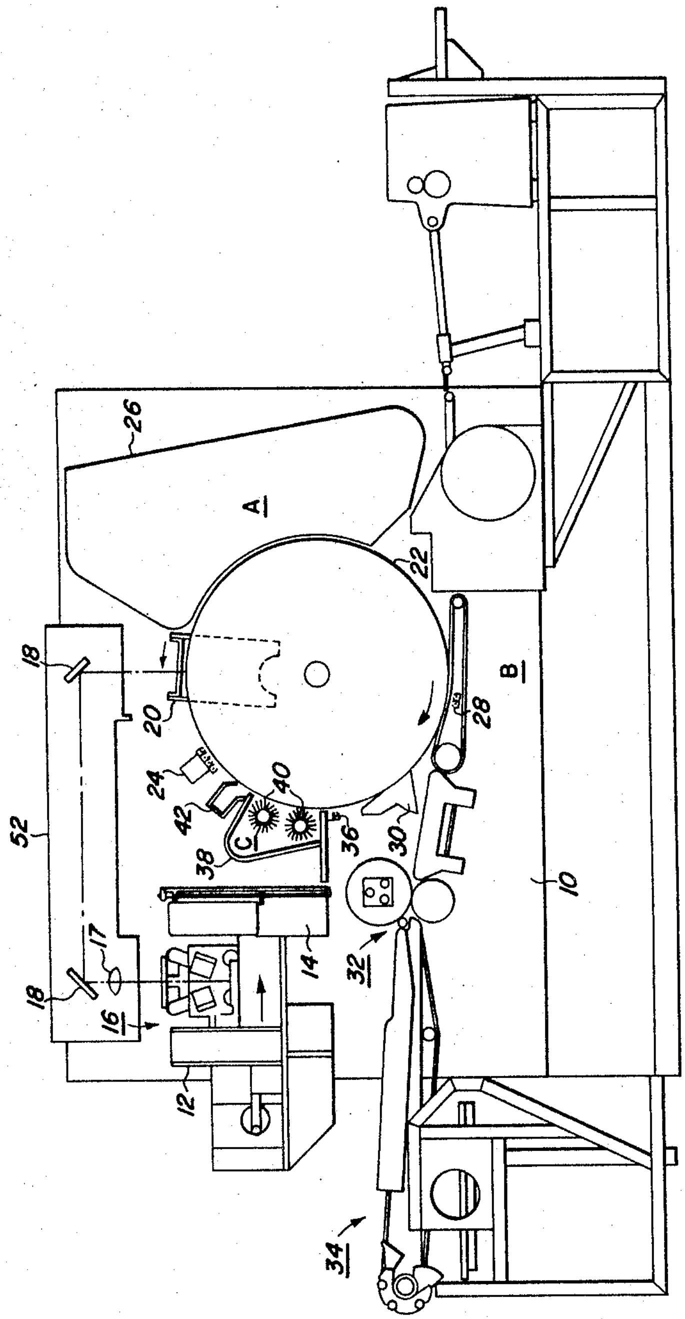
FIGURE 1 is a schematic sectional view of the apparatus incorporating the present invention.

In the particular embodiment shown in the drawings, the invention is incorporated in a minified data projection system that is a fully automatic, continuous printer for reproducing information contained on minified data opaque cards. This equipment produces copy on individual sheets of paper, that may have a width up to 9″ and a length of 14″ in a magnification ratio of approximately 3× which is enlarged to the full width of the sheet of material. It is also possible to use a web of sheet material and a sheet cutter.

As shown in FIGURE 1, the apparatus includes a base plate 10 whereby the entire apparatus is supported by or connected to the base plate. Suitable cover plates may be included to enclose the mechanism and access doors may be provided on the front of the machine to facilitate repair and adjustment. The upper section encloses the bulk of the data card handling apparatus and the optical system, as well as a data card magazine 12 for holding cards from which reproductions are to be made, and a receiving magazine 14 to which cards are ejected after minified image thereon is reproduced.

For a general understanding of the xerographic processing system in which the invention is incorporated, reference is had to FIGURE 1 in which the various system components are schematically illustrated. As in all xerographic systems, a light image of copy to be reproduced is projected onto the sensitized surface of a xerographic plate to form an electrostatic latent image thereon. Thereafter, the latent image is developed with an oppositely charged developing material to form a xerographic powder image, corresponding to the latent image, on the plate surface. The powder image is then electrostatically transferred to a support surface to which it may be fused by a fusing device, whereby the powder image is caused permanently to adhere to the support surface.

In the system disclosed herein, minified data cards are placed in the card magazine 12 from which they are fed seriatim to a card carriage in a card handling apparatus, generally designated by reference character 16 arranged adjacent the card magazine assembly. Suitable driving means are provided for the card carriage whereby it is caused to move the card past the optical axis of a light projecting system for the purpose of scanning the minified data across a scanning light line. The illuminated card is projected upwardly by means of lens 17 and mirror assembly 18 and through a movable slit aperture assembly 20 onto the surface of a xerographic plate in the form of a drum 22. The operation of the movable slit aperture will be described below.

Figure 2:
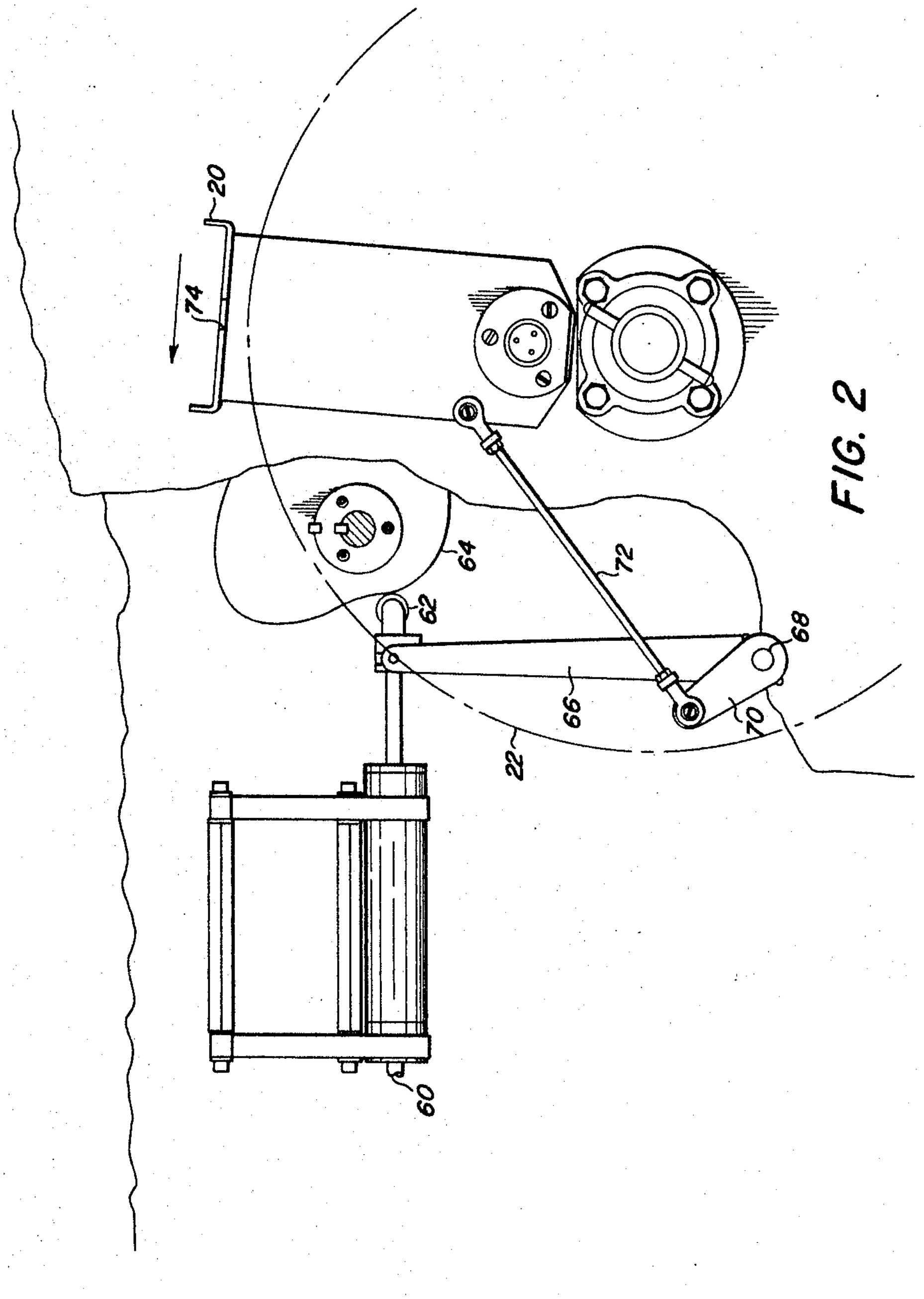
FIGURE 2 is a side view of the scanning slit and drive mechanism therefor.

The xerographic drum 22 includes a cylindrical member mounted in suitable bearings in the frame of the machine and is driven in a clockwise direction as shown in FIGURE 2 by a motor at a constant rate that is the same as the scan rate for the minified data card, whereby the peripheral rate of speed of the drum surface is the same rate of speed of the reflected light image. The movable slit moves in a counterclockwise direction in a manner described below. Since the slit is moved in the opposite direction than that of the drum the image is exposed at a rate faster than the rate at which the drum surface moves. The drum surface comprises a layer of photoconductive material on a conductive backing that is sensitized to exposure by means of a screened corona generating device 24.

The exposure of the drum to the light image discharges the photoconductive layer in the areas struck by light, whereby there remains on the drum a latent electrostatic image in image configuration corresponding to the light image projected from the minified data card. As the drum surface continues its movement, the electrostatic latent image passes through a developing station A in which there is positioned a developer apparatus including a casing or housing 26 having a lower or sump portion for accumulating developing material. A bucket-type conveyor having a suitable driving means, is used to carry the developing material to the upper part of the developer housing where it is cascaded down over a hopper chute onto the xerographic drum.

As the developing material is cascaded over the xerographic drum, toner particles are pulled away from the carrier component of the developing material and deposited on the drum to form powder images, while the partially denuded carrier particles pass off the drum into the developer housing sump. As toner powder images are formed, additional toner particles must be supplied to the developing material in proportion to the amount of toner deposited on the drum. For this purpose, a toner dispenser may be used to accurately meter toner to the developing material.

Positioned next and adjacent to the developing station is the image transfer station B which includes a sheet feeding mechanism adapted to feed sheets of paper successively to the developed image on the drum at the transfer station.

The transfer of the xerographic powder image from the drum surface to the transfer material is effected by means of a corona transfer device 28 that is located at or immediately after the point of contact between the transfer material and the rotating drum. The corona transfer device 28 is substantially similar to the corona discharge device 24 in that it includes an array of one or more corona discharge electrodes that re-energize from a suitable high potential source and extend transversely across the drum surface and are substantially enclosed within a shielding member.

In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

Immediately subsequent to the image transfer station is positioned a transfer material stripping apparatus or paper pick-off mechanism, generally designated 30, for removing the transfer material from the drum surface. The sheet material is then carried to a fixing device in the form of a fuser assembly 32, whereby the developed and transferred xerographic powder image on the sheet material is permanently fixed thereto.

After fusing, the finished copy is preferably discharged from the apparatus at a suitable point for collection externally of the apparatus. To accomplish this there is provided a conveyor, generally designated 34, by means of which the copy is delivered to a copy holder positioned in a suitable super-structure.

The next and final station in the device is a drum cleaning station C, having positioned therein a corona pre-cleaning device 36 similar to the corona charging device 24, to impose an electrostatic charge on the drum and residual powder adherent thereto to aid in effecting removal of the powder, drum cleaning device 38 adapted to remove any powder remaining on the xerographic drum after transfer by means of rotating brushes 40 and a source of light 42 whereby the xerographic drum is flooded with light to cause dissipation of any residual electrical charge remaining on the xerographic drum.

The card feeding apparatus comprises the several devices that serve to feed minified data cards seriatim from card magazine 12 (see FIG. 1) to a card carriage 50 whereby they are moved past an optical system 52 that is effective to project the minified data image onto the xerographic drum one or more times, in accordance with the number of copies required. After projection of the required number of light images, the card is ejected from the card carriage and is deposited in the receiving magazine 14.

Figure 3:
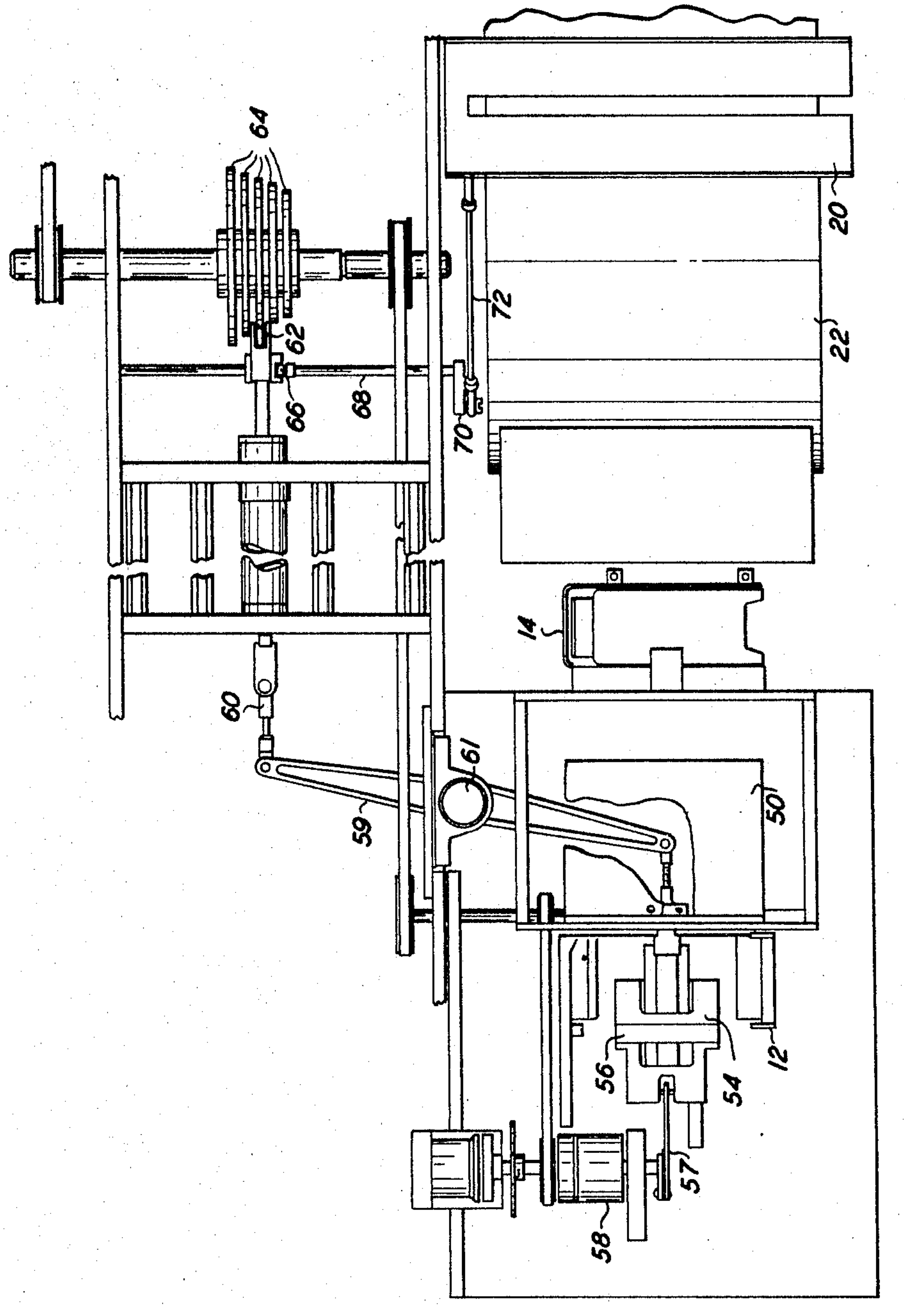
FIGURE 3 is a top view of the scanning mechanism scanning slit and drive mechanism therebetween.

For convenience of assembly and adjustment, the card feeding apparatus, as shown in FIGURE 3, is mounted on the rigid frame of the machine. Minified data cards are placed in card magazine assembly 12 that includes vertical guide members for holding a stack of cards in alignment. The magazine is arranged to permit the feeding of cards from the bottom of the card stack.

For moving each card out of the magazine, the apparatus includes a movable base block 54 that supports the trailing edge of the card stack and is provided with a picker knife 56 that is arranged to engage the trailing edge of the lowermost card of the stack. Base block 54 is mounted in suitable ways for sliding movement toward and away from the magazine, and is reciprocated in timed relation to the operation of the remainder of the card handling apparatus. For this purpose an arm 57 is actuated by a gear reducer 58 through a series of belts 63. A lever 59 is pivotally mounted on a shaft 61 fixed on the frame plate and is connected to the card carriage 50 by a suitable means. The other end of lever 59 is connected to a rod 60 having a cam follower 62 mounted thereon, which in turn is driven by one of a series of cams 64.

The cam follower 62 also actuates a pivot arm 66 pivoted about a shaft 68. As the cam follower 62 is actuated by one of the cams 64, the pivot arm 66 is pivoted about the shaft 68. Also connected to the shaft 68 is an arm 70 which serves to actuate the slit aperture assembly 20 by means of connecting rod 72. The slit aperture assembly 20 has a slot 74 therein.

Any one of the cams 64 shown can be selected depending upon the length or paper desired to be run through the xerographic machine. For example, if long sheets of paper are being run through the machine the larger cam would be used. If on the other hand, smaller sheets of paper are being run through the machine one of the smaller cams would be used. The size of the paper used depends on the amount of image area on the card or the amount of image area desired to be copied from the card. For example, it may be desired to copy only the top third of each card or one half of each card. In such a case, a smaller cam is used in order to conserve machine time and make more efficient use of the machine.

As the cam 64 that is being used engages the cam follower 62 a card is fed by the picker knife 54 through the belts 63 on to the scanning carriage 50. The cams 64 are mounted on a shaft 65 which also drives the belts 63. The shaft 65 is driven by a suitable drive means not shown. The card is fed by the picker knife 54 onto the scanning carriage 50 where it remains during the scanning process. For each rotation of the cam 64, the scanning carriage 50 is actuated. If only single copies are desired to be made the picker knife each time will pick a card from the card stack 12, thereby feeding a new card onto the scanning carriage 50 while the old card is removed from the carriage 50 by a suitable device and deposited into the receiving magazine 14. However, if multiple copies are to be produced on the machine, the card picker 54 will not pick a card on each revolution of the cam 64. The first card will be retained on the scanning carriage 50 and scanned the required number of copies. At the same time that the cam follower 62 is actuating the scanning carriage, the slit scanning assembly 20 is being actuated by the arm 66 and rod 72. Thus it can be seen for each movement of the cam 64 the scanning carriage 50 is actuated one time and the slit scanning assembly 20 is also actuated one time.

As viewed in FIGURE 1, the slit scanning aperture assembly 20 is rotated in a counterclockwise direciton while the scanner is moved from left to right. As the scanning carriage returns from right to left the slit scanner is returned from left to right. Thus it can be seen that as the scanning carriage 50 is actuated from left to right and the xerographic drum is moved in a clockwise direction due to the movement of the slit scanner, the image is exposed at a rate faster than the movement of the drum. If the slit scanner were not present, in order to lay down the image from the scanning carriage 50 onto the drum, the speed of the drum would have to be such that the image could be laid down at the same rate as that at which the scanning carriage was moving. However due to the presence and movement of the slit aperture assembly 20 the image is being exposed at a rate faster than the rate at which the drum is moving. This therefore allows the drum to move at a rate slower than would be required if the slit scanning aperture were not present. This, of course, offers many advantages inherent in such a system in that the drum need rotate at a speed slower than would ordinarily be required to place the image down on the drum. Also, for each scan the carriage 50 must be returned to its original position. Without the presence of the scanning aperture, while the carriage 50 was being returned there would be a gap or space between images on the xerographic drum 22 to allow for this return. However, due to the presence of the slit scanner 20, while the carriage is being returned so also is the slit scanner scanning aperture being returned. Thus, there is no gap between the images on the drum 22.

While the invention has been described with reference to the structure disclosed herein, it is not confined to the details set forth in this applicaiton and is intended to cover such modifications or changes as may come within the purpose of the improvements or the scope of the following claims.

What is claimed is:

1. In an electrotstatographic machine for producing reproductions of an object onto copy paper the combination of:

an electrostatographic surface,
means for moving the surface at a predetermined rate,
means for supporting the object in a scanning plane,
a projection system having an optical path adapted for scanning the object and projecting the image thereof onto the electrostatographic surface,
a scanning slit mounted adjacent the electrostatographic surface,
drive means for moving said scanning slit in a path of movement along the electrostatographic surface in a direction opposite to the direction of movement of the electrostatographic surface and for actuating the support means in the scanning plane whereby the image is projected onto the electrostatographic surface at a more rapid rate than the predetermined rate at which the electrostatographic surface is moving.

2. In an electrostatographic machine for producing reproductions of an object onto copy paper the combination of:

an electrostatographic surface,
means for moving the surface at a predetermined rate,
means for supporting the object in a scanning plane,
a projection system having an optical path adapted for scanning the object and projecting the image thereof onto the electrostatographic surface,
a scanning slit mounted adjacent the electrostatographic surface,
drive means for moving said scanning slit in a path of movement along the electrostatographic surface in a direction opposite to the direction of movement of the electrostatographic surface and for actuating the support means in the scanning plane whereby the image is projected onto the electrostatographic surface at a more rapid rate than the predetermined rate at which the electrostatographic surface is moving,
wherein said drive means includes a cam and follower said follower connected to the means for supporting the object and the scanning slit for actuating the same.

3. In an electrostatographic machine for producing reproductions of graphic information the combination of:

an electrostatographic surface,
means for moving the surface at a predetermined rate,
means for supporting graphic information in a scanning plane,
a projection system having an optical path adapted for scanning the graphic information and projecting the image thereof onto the electrostatographic surface,
an exposure means mounted adjacent the electrostatographic surface,
drive means for moving said exposure means in a path of movement along the electrostatographic surface in a direction opposite to the direction of movement of the electrostatographic surface and for actuating the support means in the scanning plane whereby the image is projected onto the electrostatographic surface at a more rapid rate than the predetermined rate at which the electrostatographic surface is moving.

4. A machine as recited in claim 2 including additional cams each having a different camming surface and adapted to be interchangeably connected with said follower to obtain different size outputs of copies reproduced.

References Cited

UNITED STATES PATENTS 3,062,095 11/1962 Rutkus et al. ---------- 88—24

NORTON ANSHER, *Primary Examiner.*

DAVID B. WEBSTER, *Assistant Examiner.*